Inventors
Frederick J. Sparber
Johnnie F. McDonald
By E.L. Amonette
    Agent

United States Patent Office 3,170,270
Patented Feb. 23, 1965

3,170,270
FASTENER
Frederick J. Sparber, 911 Delgado St., and Johnnie F. McDonald, 204 Avenida del Fuego, both of Belen, N. Mex.
Filed July 9, 1962, Ser. No. 208,224
6 Claims. (Cl. 50—313)

This invention relates generally to fasteners, and more particularly to fasteners used in the construction industry to connect a pair of structural members, such as a piece of wallboard and a support therefor.

Prior art construction methods use a wooden framework to which wallboard is fastened by means of nails. A light coat of plaster or texture paint on the surface of the wallboard covers up the nail heads for a better appearance. The fastener to be described has been designed for use with a structural module although it will be apparent that the fastener is capable of many other uses in the construction industry and outside of it. The structural module mentioned above is made up entirely of wire members and thus requires a fastener which will grasp a wire securely to hold wallboard on the module.

It is a general object of this invention to provide a fastener for holding a construction member to a cross wire or rod. A more specific object of the invention is to provide such a fastener which is economical to manufacture, and which is quickly and easily installed by unskilled personnel.

Still another object of this invention is to provide a fastener which is capable of blind installation, and which may grasp a variety of cross members with equal security.

A better understanding of the invention may be had by reading the more detailed description to follow in conjunction with the appended claims and the attached drawing, in which:

Figure 1:
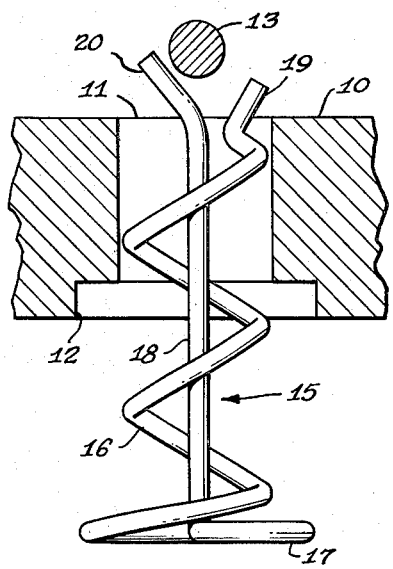
FIG. 1 is a sectional view of a piece of wallboard, showing a preferred embodiment of the invention in the process of installation.

Briefly, the invention accomplishes the foregoing and other objects to become apparent by means of a novel combination of a helical, preferably wire, member and a straight member extending more or less axially within the helical member and joined thereto at one end by a head. The head has a diameter greater than that of the helix, so that the helix may extend through a hole in the wallboard with the head abutting the outside surface thereof. The helix and the straight member are proportioned to grasp a cross member between them with the straight member forced to one side of the helix. To install the fastener, it is inserted in a hole in the wallboard and turned in a direction to thread the helix around and on to the cross member, pulling the wallboard against the cross member as the cross member in effect travels up the helix toward the head of the fastener.

Referring now to the drawing, wallboard 10 has a circular aperture 11 therein, including an enlarged portion 12 which is a countersink on the outside of the wallboard. Cross rod 13 is located on the inside of the wallboard, is substantially parallel thereto, and may be part of a supporting structure for a wall or other structural element.

Fastener 15 extends through aperture 11, helix 16 being of a diameter to pass freely through the aperture, and of a length to reach cross bar 13. Head 17 joins helix 16 and straight member 18 at one end, the head being somewhat larger than the helical diameter so it will not pass through aperture 11, but bears against countersink 12 instead. If desired, the countersink may be omitted in which case head 17 will bear against the outside of the wallboard, creating a surface irregularity which must be covered with plaster or the like in order to create a smooth surface.

The fastener is shown in FIG. 1 before it is installed on the cross bar. Straight member 18 is seen to extend within the helical member substantially parallel to the helical axis. Ends 19 and 20 of the helix and the straight member respectively are divergent, to allow greater tolerance in the relative location of the cross bar and aperture 11, and still insure easy connection of the fastener to the cross bar. If the divergence were not provided it would be rather difficult to install the fastener, because the helical internal diameter is approximately the sum of the diameters of the cross bar and the straight member to make certain a firm grip on the cross bar by the fastener.

Figure 2:
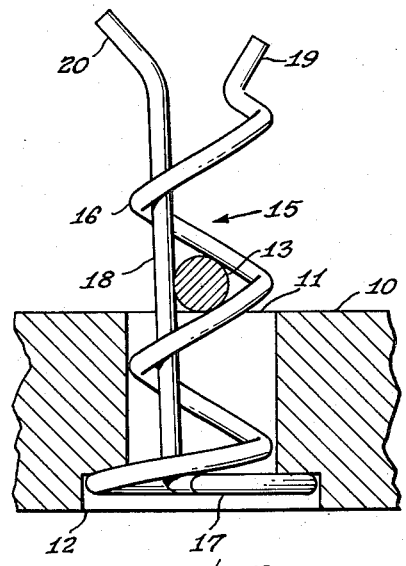
FIG. 2 shows the embodiment of FIG. 1 completely installed.

The fastener is installed by turning it in the proper direction to thread the helix on to the cross bar until the wallboard is pulled against the cross bar, as shown in FIG. 2. It will be noticed that as the threading occurs straight member 18 is forced from its center position to one side of the helix. The fastener material is preferably chosen to resist permanent deformation, so that the tendency of straight member 18 to return to its axial position produces a gripping force on cross bar 13 between the straight member and the helix.

Figure 3:
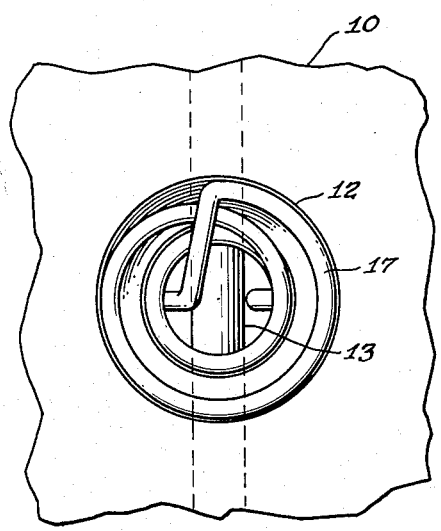
FIG. 3 is an end view of the installation of FIG. 2.

The fastener shown in FIGS. 1–3 is of one-piece construction from a single length of wire for reasons of ease and economy of manufacture. However it is not intended to limit the patent to this structure since it is quite feasible to connect the helix and the straight member at one end by means of other types of heads without deviating from the sphere and scope of the invention as claimed.

Figure 4:
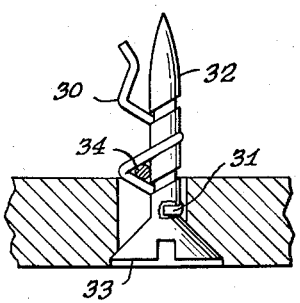
FIG. 4 is a sectional view of wallboard showing an alternate embodiment of the invention.

The alternate embodiment of FIG. 4 includes a helix 30 fastened at one end 31 to straight member 32 by spot welding or other means. Member 32 is helically grooved in the same direction as the helix, but with half the pitch. This gives the helix a choice of grooves to follow when, during installation of the fastener, cross bar 34 distorts the fastener from the normal centered relationship of straight member 32 to helix 30. Member 32 and helix 30 could have the same pitch, but the possibility of distortion of the helix in the axial direction makes preferable a shorter pitch for member 32. The fastener of FIG. 4 has the advantage that, once the helix is forced into a groove, there can be no axial displacement of the helix relative to the straight member which will allow the wallboard to spring away from the cross bar. Installation of the fastener is facilitated by head 33 being grooved for a screwdriver. Divergence of the free ends of the helix and the straight member is again provided as in the embodiment of FIGS. 1–3.

A fastener has been described which simplifies the installation of wallboard or other structural members on a cross bar, wire, or other supporting structure. The fastener is economically produced and saves considerable installation time and labor, being particularly useful with wire structural modules designed to support members such as wallboard. The preferred embodiments shown are exemplary, the sphere and scope of the invention being defined by the claims below.

What is claimed is:
1. A fastener for holding a construction member to a cross rod, comprising:

a wire helix for extending through a hole in the construction member to the cross rod;

a straight member extending within the helix substantially parallel to the helical axis, and being helically grooved in the same direction as the helix; and a head connecting the helix and the straight member at one end, extending beyond the helical diameter so as to bear against the outside of the construction member; the internal diameter of the helix approximating the sum of the cross rod diameter and the straight member diameter less the groove depth, whereby the cross rod may be gripped between the helix and the straight member.

2. The fastener of claim 1 wherein the other end of the helical member and the straight member are divergent.

3. The fastener of claim 2 wherein the straight member is grooved with a shorter pitch than that of the helix.

4. The fastener of claim 2 wherein the straight member is grooved with half the pitch of the helix.

5. Means for supporting a construction member comprising, in combination:

a straight member;

a helical member for extending through a hole in the construction member, surrounding the straight member and having an inside diameter considerably greater than the diameter of the straight member;

a head connecting the helical and straight members at one end and extending beyond helical diameter so as to bear against the outside of the construction member;

and a cross rod having a diameter approximating the difference of the diameters of the straight member and of the inside of the helical member, said cross rod being grasped between the straight and helical members so as to bear against the inside of the construction member.

6. The supporting means of claim 5, wherein the other end of the helical member and the straight member are divergent.

References Cited by the Examiner
UNITED STATES PATENTS

| | | | |
|---|---|---|---|
| 556,082 | 3/96 | Boeddinghaus | 50—472 |
| 1,082,540 | 12/13 | MacColl et al. | 50—481 X |

FOREIGN PATENTS 546,517    8/22    France.

JACOB L. NACKENOFF, *Primary Examiner.*
HENRY C. SUTHERLAND, *Examiner.*